United States Patent Office 2,744,908
Patented May 8, 1956

2,744,908

PROCESS FOR PREPARING SUBSTITUTED-MERCAPTO-1,3,4-THIADIAZOLES

Richard William Young, Riverside, Conn., assignor to American Cyanamid Company, New York, N. Y., a corporation of Maine No Drawing. Application January 27, 1954,
Serial No. 406,604

9 Claims. (Cl. 260—302)

This invention relates to a method for preparing organic compounds, and more particularly, to a method for preparing substituted-mercapto-1,3,4-thiadiazoles and derivatives thereof.

Among the objects of this invention is a novel process for producing 5-substituted-mercapto-1,3,4-thiadiazoles by the cyclization of simple dithiocarbazates under acidic conditions.

Another object of this invention is to provide a convenient method for preparing derivatives of 1,3,4-thiadiazole from readily available and conveniently economical starting materials.

The novel compounds with which this invention is particularly concerned are those having the formula:

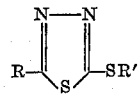

wherein R is a member selected from the group consisting of hydrogen atoms, alkyl, aryl and heterocyclic radicals, such as methyl, ethyl, phenyl, thiazolyl, pyridyl, furoyl, p-nitrophenyl, p-chlorophenyl and p-ethoxyphenyl, and R' is a member selected from the group consisting of alkyl and alkaryl radicals such as methyl, ethyl, benzyl, 2,4-dinitrobenzyl. These compounds are useful as larvicidal agents in the field of agriculture and as intermediates in the preparation of sulfonamide derivatives. In the latter respect, the 2-aralkylmercapto-thiadiazole may be converted to the corresponding sulfonyl chloride by treatment with chlorine gas, followed by conversion to the sulfonamide upon reaction with ammonia. This method constitutes the subject matter of copending United States application, S. N. 406,605, filed concurrently herewith by Richard William Young.

In accordance with the present invention, an acyl-dithiocarbazate wherein R and R' are as defined above and having the formula:

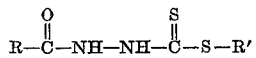

is reacted with a strong organic or mineral acid. The presence of the concentrated acid effects the cyclization of the acyl-dithiocarbazate to a 1,3,4-thiadiazole having substituents in the 2 and 5 positions corresponding to those present on the starting material prior to cyclization, the R and R' groups being nonfunctional and not taking part in the cyclization reaction. The strongly acidic condition of the reaction at times causes the temperature of the reaction mixture to rise, but external cooling is usually not required.

When the reaction is completed, the mixture may be placed in contact with ice to effect dilution of the mixture and thus cause the precipitation of the thiadiazole which is then dried and recrystallized from an organic solvent such as alcohol, petroleum ether or ice-acetone solution.

As one modification of the present invention, the thiadiazole may be prepared directly from dithiocarbazate esters by reacting the latter compounds with an hydride such as acetic or butyric anhydride, followed by addition of a strong acid to the reaction mixture. The dithiocarbazates are thus converted to the acyl-dithiocarbazates which are immediately cyclized, without isolation, to the thiadiazoles.

Where the acid used for cyclizing is formic acid, the acylation step may be omitted because the excellent formylating ability of formic acid itself permits the conversion of the unacylated dithiocarbazate directly to the heterocyclic substituted-mercaptan. Thus, reaction of the dithiocarbazate with formic acid, results in the formation of the intermediate acyl-dithiocarbazate which simultaneously cyclizes to the thiadiazole.

Any strong mineral or organic acid having a pK value of less than 3.5 may be used to effect cyclization of the acyl-dithiocarbazate ester such as for example, sulfuric, polyphosphoric, toluenesulfonic acid monohydrate, trifluoracetic or formic.

The reaction between the dithiocarbazate and the acid takes place at temperatures varying between room temperature and 100° C., depending upon the nature of the groups present on the dithiocarbazate ester and the kind of acid selected for the reaction. Where the dithiocarbazate ester does not readily dissolve upon contact with the acid, the application of heat to effect dissolution is necessary, the degree to which the temperature is increased being a matter within the purview of one skilled in the art.

The following examples are shown to illustrate the specific embodiments of this invention but are not intended as a limitation thereof:

Example I

One gram of N-benzoylmethyldithiocarbazate was dissolved at room temperature in 10 cc. of concentrated sulfuric acid causing the temperature of the solution to rise to 40° C. After 3 minutes, the solution was poured onto ice, the crystalline product being isolated by filtration. After drying in air, 0.90 g. (85%), M. P. 55–56° C. of 2-phenyl-5-methylmercapto-1,3,4-thiadiazole was obtained.

Example II

When 9.3 g. of N-benzoylmethyldithiocarbazate was warmed at 85° for 15 hours with polyphosphoric acid, solution did not occur, but on treatment with water, the syrupy slurry dissolved leaving behind a tan sticky solid which was washed with water and dried in air, M. P. 48–50° C. It was recrystallized from petroleum ether (B. P. 30–60° C.) by chilling in a Dry Ice-acetone solution, to yield 2-phenyl-5-methylmercapto-1,3,4-thiadiazole.

Example III

A solution of 1.0 g. of N-benzoylmethyldithiocarbazate was refluxed in 25 cc. of benzene with 0.1 g. of toluenesulfonic acid monohydrate for 2 hours and was allowed to stand at room temperature overnight. The solution after washing with sodium bicarbonate solution (saturated) and water, was dried over sodium sulfate. Following removal of the drying agent the solution was evaporated, producing 2-phenyl-5-methylmercapto-1,3,4-thiadiazole, M. P. 53–55° C. After recrystallization of this sample from petroleum ether, 0.68 g. of 2-phenyl-5-methylmercapto-1,3,4-thiadiazole, M. P. 55–56° C., was obtained.

Example IV

A small sample of N-benzoylmethyldithiocarbazate was refluxed with excess trifluoracetic acid for 3 minutes and diluted with ice to give 2-phenyl-5-methylmercapto-1,3,4-thiadiazole.

Example V

Two grams of N-benzoylbenzyldithiocarbazate was dissolved in 20 cc. of concentrated sulfuric acid. After 3 minutes the solution was poured onto 125 grams of ice, resulting in the precipitation of 1.72 grams of 2-phenyl-5-benzylmercapto-1,3,4-thiadiazole (91%), melting point M. P. 92 to 109° C. After crystallization from alcohol, 1.26 grams (67%) M. P. 107–109° C. was obtained.

Example VI

Twenty grams of N-acetylbenzyldithiocarbazate was dissolved in 200 cc. of concentrated sulfuric acid. After 3 minutes, the solution was poured into ice causing the precipitation of 7.5 grams (40%) of solid, M. P. 58–62° C. After crystallizing from absolute alcohol, 5.7 grams, M. P. 62–63° C. of 2-methyl-5-benzylmercapto-1,3,4-thiadiazole was obtained.

Example VII

A better yield can be obtained from the N-acetylbenzyldithiocarbazate when a smaller quantity of concentrated sulfuric acid can be used. When 65 cc. of concentrated acid was used to dissolve 12.8 grams of N-acetylbenzyldithiocarbazate, dilution with water gave 8.1 grams of 2-methyl-5-benzylmercapto-1,3,4-thiadiazole and an additional 1.4 grams could be extracted from the aqueous layer using ethylacetate giving a crude yield of 81%. Recrystallization from aqueous alcohol gave 6.9 grams (59%) of pure 2-methyl-5-benzylmercapto-1,3,4-thiadiazole, M. P. 62.5–64° C.

Example VIII

Ten grams of benzyldithiocarbazate was dissolved in 100 grams of acetic anhydride by warming for a few minutes. The solution was cooled carefully to avoid crystallization of N-acetylbenzyldithiocarbazate, and 50 cc. of concentrated sulfuric acid was added dropwise. Addition of the acid caused a vigorous exotherm and the reaction mixture was subsequently maintained around 45° C. by cooling. This solution was poured into ice and 2-methyl-5-benzylmercapto-1,3,4-thiadiazole was isolated, M. P. 62.5–64° C.

Example IX

Ten grams of benzyldithiocarbazate was dissolved in 79.5 grams of formic acid (98+%) at room temperature. After warming to 45° C., 5.15 grams of acetic anhydride was added, the solution then being heated for 10 minutes at 70° C. Upon pouring the above solution into ice, a crystalline solid was precipitated, 9.93 grams (95%), M. P. 54–58° C. Recrystallization from 50% alcohol gave 8.74 grams (83%), M. P. 58.5–60° of 2-benzylmercapto-1,3,4-thiadiazole.

Example X

Because of the excellent formylating ability of formic acid itself, the same experiment as above was performed but omitting acetic anhydride. A crude yield of 9.88 grams (92%), M. P. 56–58° C., 2-benzylmercapto-1,3,4-thiadiazole was obtained, which fell to 79%, M. P. 58–59.5° after crystallization from 50% alcohol.

I claim:

1. A method for preparing compounds having the general formula:

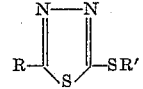

wherein R is a member selected from the group consisting of hydrogen atoms, alkyl, phenyl, thiazolyl, pyridyl, furoyl, p-nitrophenyl, halogenated phenyl and p-ethoxyphenyl radicals and R' is a member selected from the group consisting of alkyl and benzyl and 2,4-dinitrobenzyl radicals which comprises reacting a compound of the class:

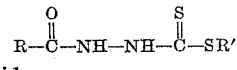

with a strong acid.

2. A method as set forth in claim 1, wherein the strong acid is one having a pK value of less than 3.5.

3. A method for preparing 2-alkyl-5-aralkylmercapto-1,3,4-thiadiazoles which comprises reacting an N-alkanoyl-aralkyl-dithiocarbazate ester with a strong acid.

4. A method for preparing 2-phenyl-5-methylmercapto-1,3,4-thiadiazole which comprises reacting N-benzoyl-methyldithiocarbazate with a strong acid.

5. A method for preparing 2-phenyl-5-benzylmercapto-1,3,4-thiadiazole which comprises reacting N-benzoyl-benzyldithiocarbazate with a strong acid.

6. A method for preparing 2-methyl-5-benzylmercapto-1,3,4-thiadiazole which comprises reacting N-acetylbenzyl-dithiocarbazate with a strong acid.

7. A method for preparing 5-benzylmercapto-1,3,4-thiadiazole which comprises reacting benzyldithiocarbazate with a strong acid.

8. 5-benzylmercapto-1,3,4-thiadiazole.

9. 2-methyl-5-benzylmercapto-1,3,4-thiadiazole.

References Cited in the file of this patent

Freund et al.: Ber. Deut. Chem., vol. 28, p. 946 (1895).
Guha: JACS., vol. 44, pp. 1502–8 (1922).
Guha et al.: Chem. Abst., vol. 21, pp. 3199–3200 (1927).
Bambas: "Heterocyclic Compounds" (Interscience) pp. 146–48, 150 (1952).